Sept. 20, 1932.  H. M. ALBEE  1,877,782
VALVE SEAT GRINDER
Filed Oct. 2, 1930   2 Sheets-Sheet 1
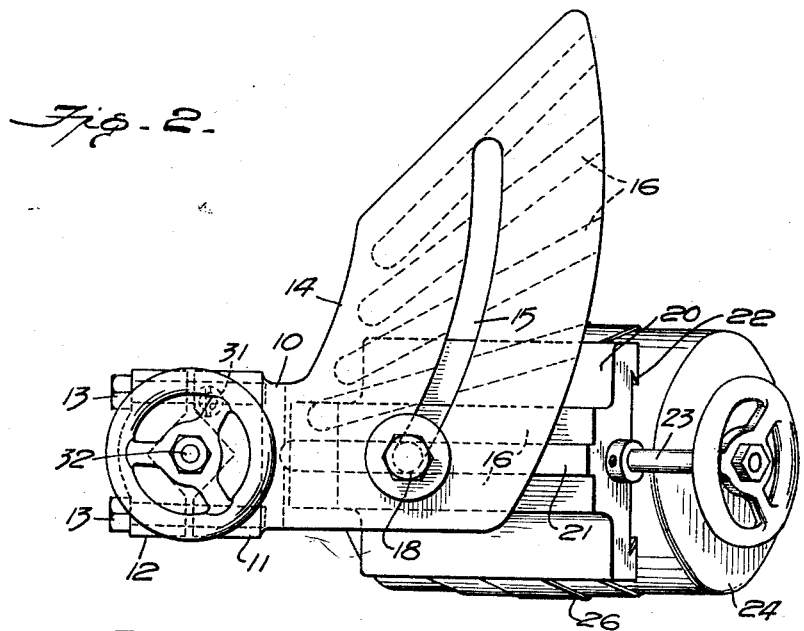
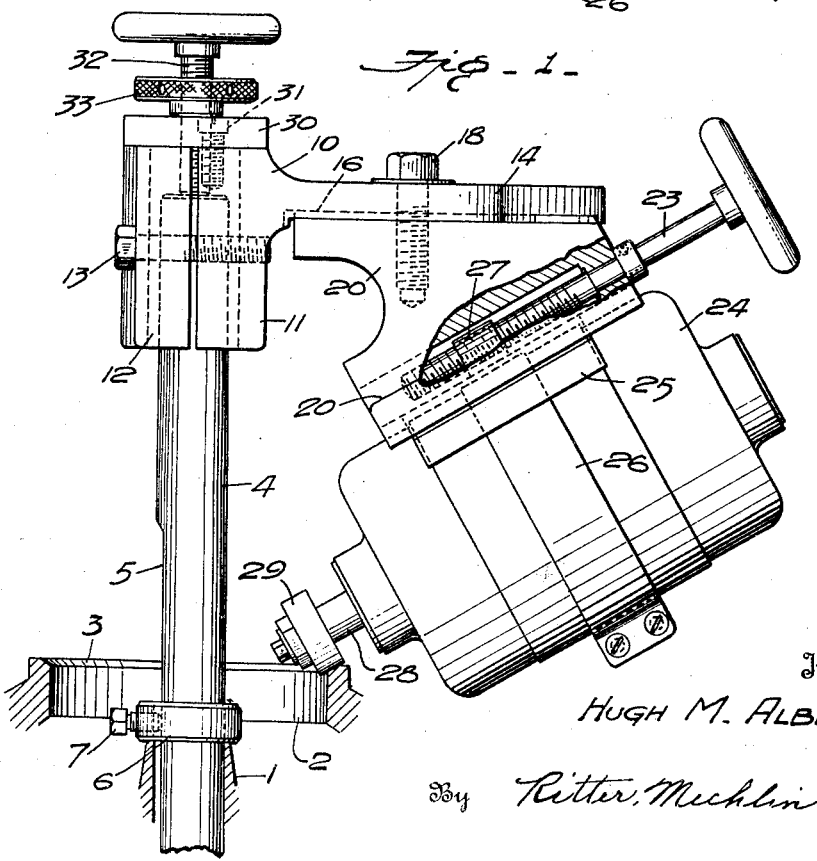

Sept. 20, 1932.  H. M. ALBEE  1,877,782
VALVE SEAT GRINDER
Filed Oct. 2, 1930  2 Sheets-Sheet 2
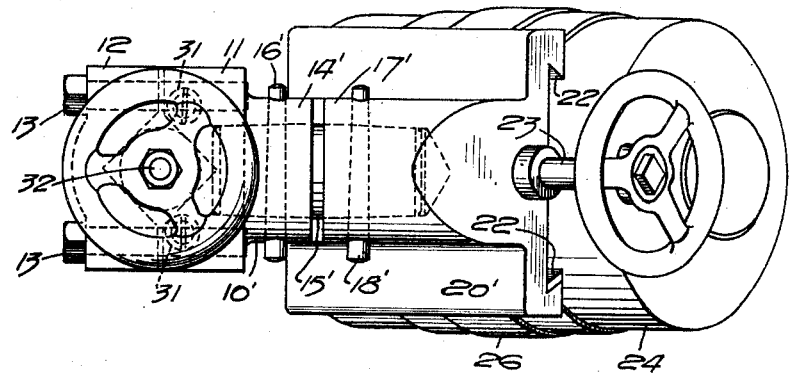
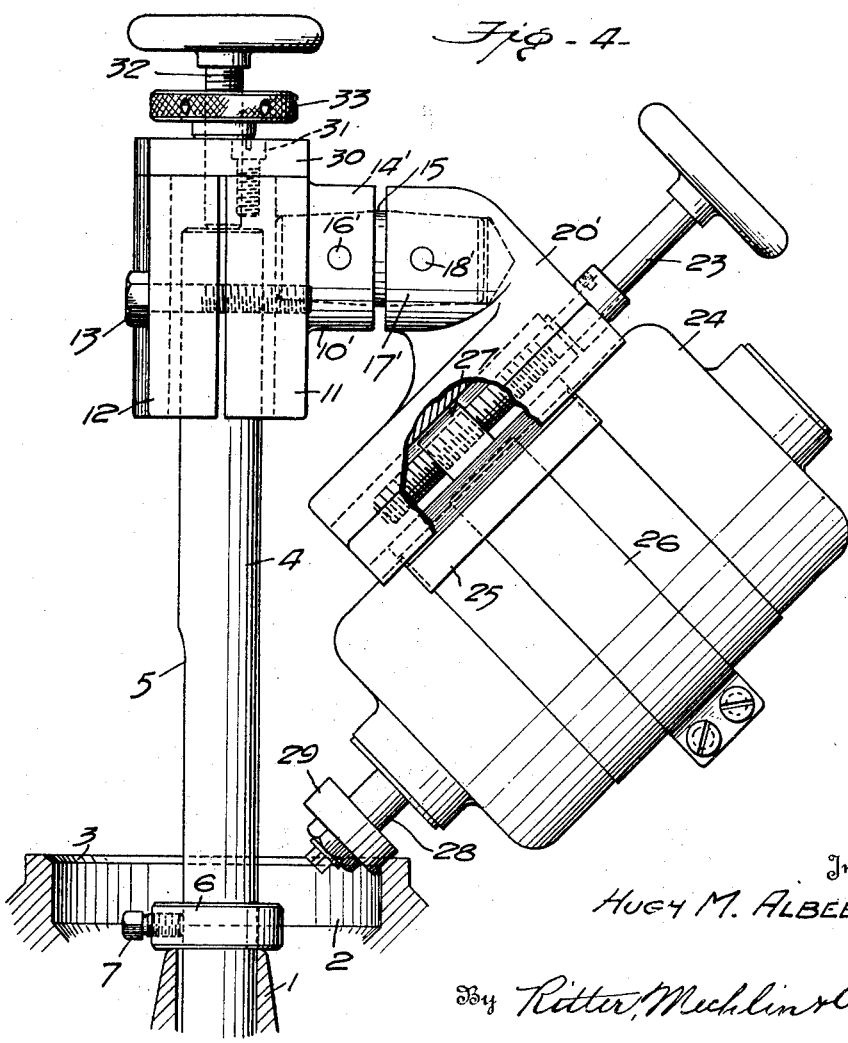
Inventor
HUGH M. ALBEE
By Ritter, Mechlin & O'Neill
Attorneys Patented Sept. 20, 1932

1,877,782

UNITED STATES PATENT OFFICE

HUGH M. ALBEE, OF ORANGE, MASSACHUSETTS, ASSIGNOR TO THE LEAVITT MACHINE COMPANY, OF ORANGE, MASSACHUSETTS

VALVE SEAT GRINDER

Application filed October 2, 1930. Serial No. 486,010.

The invention relates to a machine for grinding valve seats of the type involving a central valve stem guide, and has for its object to provide a relatively simple, self-contained, power actuated grinder adapted to be supported on a spindle mounted in the valve stem guide, the grinding wheel being fixed to the end of the shaft of an electric motor, which is angularly and slidably mounted on a guide block element of a bracket which is adjustably mounted on the end of the spindle, the bracket having a feeding connection with the spindle and the motor a similar connection with the bracket, suitable means being provided for adjusting the motor radially toward and from the supporting spindle to adapt the machine to operate on valve seats of different sizes or diameters.

The invention is illustrated in the accompanying drawings, in which:—

Fig. 1 is a side elevation, partly in section, of one form of the machine as applied to the grinding of a valve seat of a Diesel or similar engine.

Fig. 2 is a plan view of the machine.

Fig. 3 is a view similar to Fig. 1 showing a modified form of the apparatus.

Fig. 4 is a plan view of the latter machine.

Referring to Figs. 1 and 2, 1 indicates a tubular valve stem guide, which is fixed centrally and axially within the valve port 2, which latter is finished with the usual tapered valve seat 3.

Snugly fitting the bore of the valve stem guide 1 is a spindle 4 provided with a flat face 5 extending longitudinally of the spindle for a portion of its length, by means of which a collar 6 surrounding the spindle may be clamped thereto by a set screw 7, so that the spindle will be supported firmly but rotatably in the valve stem guide with a predetermined length of the spindle extending above said guide.

Secured to the upper end of the spindle is a bracket 10, including a split sleeve formed of sections 11 and 12 embracing the upper end of the spindle and connected by bolts 13, 13. The bracket also includes a wing-shaped member 14 provided with a slot 15 eccentric to the longitudinal axis of the sleeve and the spindle 4 and having on its under face a series of radial grooves 16, which open into the curved outer edge of the wing section, the slot 15 being adapted to receive a bolt or stud 18, which engages a threaded opening in a guide block 17 constituting an adjustable member of the bracket, the upper face of which is finished with a longitudinal rib 21 adapted to be selectively engaged with the slots 16 on the under face of the wing section 14 of the bracket, whereby the guide member 20 may be adjusted at various distances from the spindle 4.

The lower face of the guide block 20 is inclined at a predetermined angle to the longitudinal axis of the spindle 4 to correspond with the angular bevel of the valve seat to be ground and said inclined face is provided with a longitudinal guide slot 22 having undercut lateral flanges which receive the beveled edges of a slide 25, which is secured to an electric motor 24 by means of a strap 26, the upper face of the slide having a screw threaded socket 27, which is engaged by a feed screw 23 rotatably supported in the guide block member 20 of the bracket.

The shaft 28 of the motor 24 is parallel with the inclined face of the guide block 20 and to the end of the shaft is secured a grinding wheel 29, the relation of the various parts being such that the cylindrical face of the grinding wheel will grind the surface of the valve seat to the desired angle or bevel.

In order to feed the grinding wheel toward the work, a suitable feed screw connection between the bracket 10 and the end of the spindle 4 is provided, the same comprising a threaded nut or collar 30, which is secured to the sleeve of the bracket by one or more bolts 31, which nut is engaged by a feed screw 32, the lower end of which bears upon the upper end of the spindle 4, the feed screw being provided with an operating wheel and with an adjustable set nut 33 by means of which it is held in its adjusted position.

In applying the machine to its intended purpose, the spindle 4 of the machine is engaged with the valve seat guide 1 and the collar 6 clamped to the spindle, so as to bring the grinding wheel 29 a slight distance above the valve seat. The electric motor is then started and the grinding wheel brought into engagement with the valve seat by operating the feed screw 32 to lower the bracket 10 a slight distance on the spindle. The machine is then rotated bodily on the spindle 4 as an axis, so that the grinding wheel is caused to engage and resurface the valve seat throughout the entire peripheral extent of the latter. If the valve seat is of a considerable width, it will also be found necessary to cause the grinding wheel to traverse the valve seat radially as well as circumferentially and such radial movement may be imparted by the feed screw 23, which effects the movement of the motor 24 toward and from the spindle. For operating upon valve seats of different sizes or diameters, the necessary adjustment of the grinding wheel 29 to properly engage the work may be effected by engaging the guide block 20 with the appropriate groove 16 in the under face of the winged section 14 of the bracket, so that the guide block and the motor will be adjusted at appropriate distances from the spindle, and the guide block locked in its adjusted position by the stud 18 engaging the slot 15.

In the modification shown in Figs. 3 and 4, the only material difference is in the construction of the bracket which supports the motor on the spindle 4 and the parts of the device which are similar in structure and arrangement to those of the modification first described are indicated by the same reference numerals and require no further description. The bracket 10' includes the same split sleeve elements 11 and 12 for securing the same in position on the end of the spindle 4 and formed integrally with the sleeve member 11 is a socketed projection 14 having a tapered bore adapted to receive one end of an interchangeable taper-ended pin 15', the said pin being locked in the socket 14' by means of a cotter pin 16'.

The guide block proper 20' of the bracket has formed thereon a socketed projection 17' adapted to be brought into alignment with the socketed member 14' and to be rigidly secured to the other member of the bracket by engaging the outer tapered end of the pin 15', which is locked to the socket member 17' by a cotter pin 18'. By providing the machine with a series of tapered ended pins 15' of different lengths, the spacing of the guide block 25 laterally with respect to the supporting spindle 4 may be readily effected to adjust the motor and the grinding wheel carried thereby to operate upon valve seats of different diameters. After the guide block member 20', the motor 24 and the grinding wheel 29 have been properly adjusted by the installation of pin 15' of proper length, the operation of the machine will be precisely the same as that hereinbefore described, the grinding of the valve seat being effected by bringing the grinding wheel into engagement with the seat and rotating the machine as a whole with the spindle 4 as the axis, feeding the grinding wheel normal to the surface of the work by the feed screw connection between the spindle and the bracket and traversing the grinding wheel radially of the surface of the seat by the feed screw 23 connecting the motor to the guide block.

What I claim is:

1. A machine for grinding valve seats having a central valve stem guide, comprising a spindle adapted to engage said guide, a bracket having a sleeve engaging the top of said spindle and provided with a wing section having radial grooves in one face and an eccentric slot, a guide block having a rib to be selectively engaged with said grooves and a face inclined to the axis of said spindle, a bolt traversing the slot to lock the block in adjusted position, an electric motor having a sliding engagement with the inclined face of said guide block and having its shaft parallel with said face, a grinding wheel on the shaft of said motor, means for effecting feeding adjustments of the bracket, and means for reciprocating the motor on the guide block.

2. A machine for grinding valve seats having a central valve stem guide, comprising a spindle adapted to engage said guide, a bracket having a sleeve engaging the top of said spindle and provided with a wing section having radial grooves in one face and an eccentric slot, a guide block having a rib to be selectively engaged with said grooves and a face inclined to the axis of said spindle, a bolt traversing the slot to lock the block in adjusted position, an electric motor having a sliding engagement with the inclined face of said guide block and having its shaft parallel with said face, a grinding wheel on the shaft of said motor, a feed screw carried by the bracket and engaging the end of the spindle and a screw feed connecting the motor to the guide block.

3. A machine for grinding valve seats having a central valve stem guide, comprising a spindle adapted to engage said guide, a bracket including a split sleeve engaging the end of the spindle and having a lateral socket, a guide block having a lateral socket and a guide face disposed at an angle to the axis of the spindle, a stud engaging the sockets to lock the bracket sections together, an electric motor having a sliding engagement with the inclined face of the guide block with its shaft parallel to said face, a grinding wheel on the shaft of said motor, means for effecting feeding adjustments of the bracket, and means for slidably adjusting the motor on the guide block.

4. A machine for grinding valve seats having a central valve stem guide, comprising a spinle adapted to engage said guide, a bracket including a split sleeve engaging the end of the spindle and having a lateral socket, a guide block having a lateral socket and a guide face disposed at an angle to the axis of the spindle, a stud engaging each socket to lock the bracket sections together, an electric motor having a sliding engagement with the inclined face of the guide block with its shaft parallel to said face, a grinding wheel on the shaft of said motor, a feed screw carried by the bracket and engaging the end of the spindle, and a screw feed connecting the motor to the guide block.

5. A machine for grinding valve seats having a central valve stem guide, comprising a spindle adapted to engage said guide, a bracket including a split sleeve engaging the end of the spindle, a guide block secured to said bracket and having a face inclined to the axis of said spindle, an electric motor having sliding engagement with the inclined face of said guide block with its shaft parallel to said face, a grinding wheel on the shaft of said motor, means for effecting feeding adjustments of the bracket on the spindle, and means for reciprocating the motor on the guide block.

In testimony whereof I affix my signature.

HUGH M. ALBEE.